Oct. 12, 1937.  O. L. KONOW  2,095,364

HARVESTER REEL

Filed April 3, 1937    2 Sheets-Sheet 1

Inventor
O. L. Konow

By Clarence A. O'Brien
Hyman Berman
Attorneys

Oct. 12, 1937.   O. L. KONOW   2,095,364
HARVESTER REEL
Filed April 3, 1937   2 Sheets-Sheet 2

Inventor
O. L. Konow
By Clarence A. O'Brien
Hyman Berman
Attorneys

Patented Oct. 12, 1937

2,095,364

UNITED STATES PATENT OFFICE 2,095,364

HARVESTER REEL

Otto L. Konow, Lockport, Ill., assignor of one-half to Hal B. Reed, Lockport, Ill.

Application April 3, 1937, Serial No. 134,873

1 Claim. (Cl. 56—221)

The present invention relates to new and useful improvements in reels for agricultural machines such as harvesters and combines and has for its primary object to provide, in a manner as hereinafter set forth, means whereby the reel may be conveniently raised or lowered to any desired position from the operator's seat of the tractor or other power unit to meet various conditions that are frequently encountered, such as tall and short grain.

Another very important object of the invention is to provide novel means for maintaining the proper tension on the drive belt regardless of the position of the reel.

Other objects of the invention are to provide a reel of the aforementioned character for agricultural machines which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
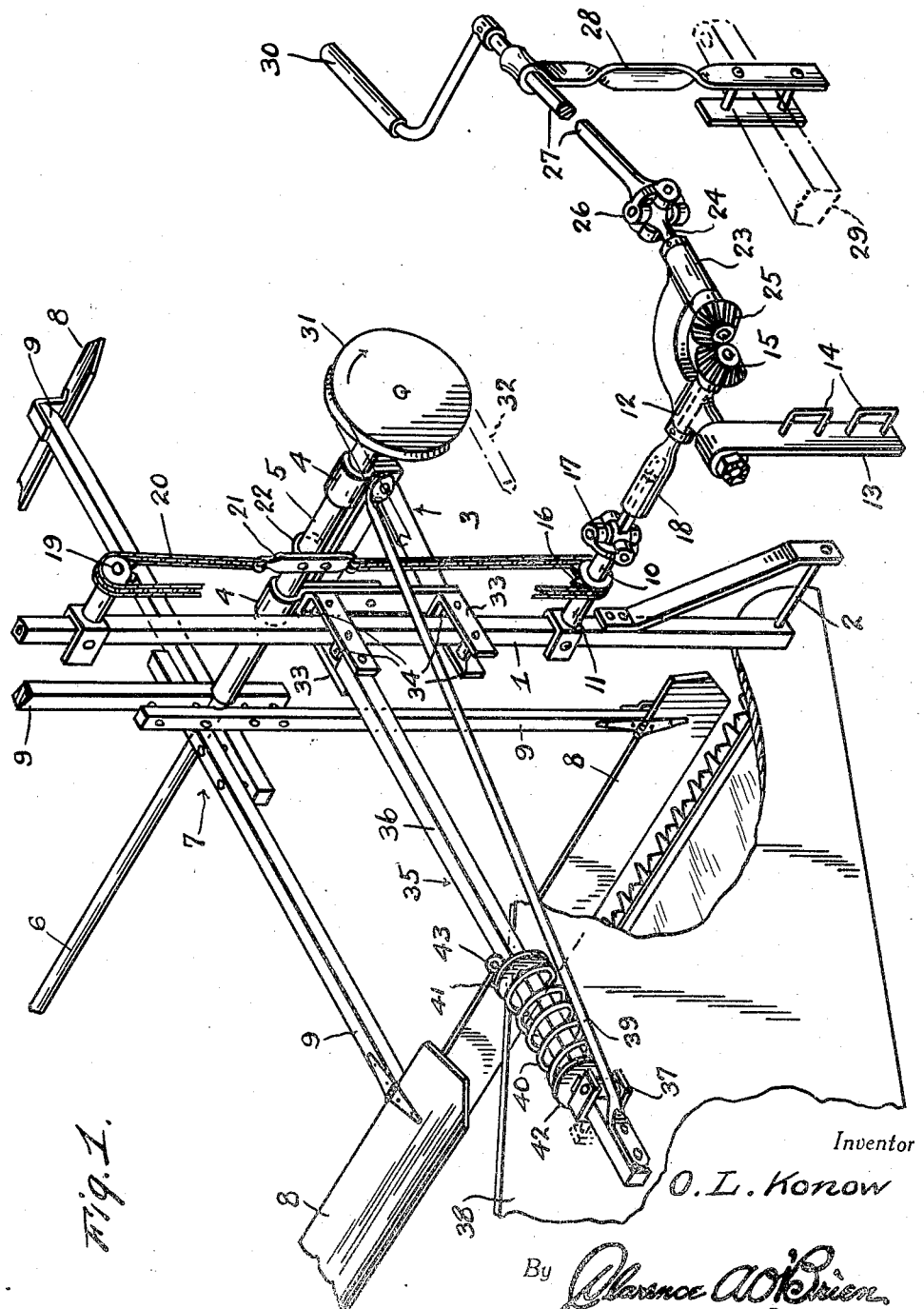
Figure 1 is a perspective view of an embodiment of the invention.
Figure 2:
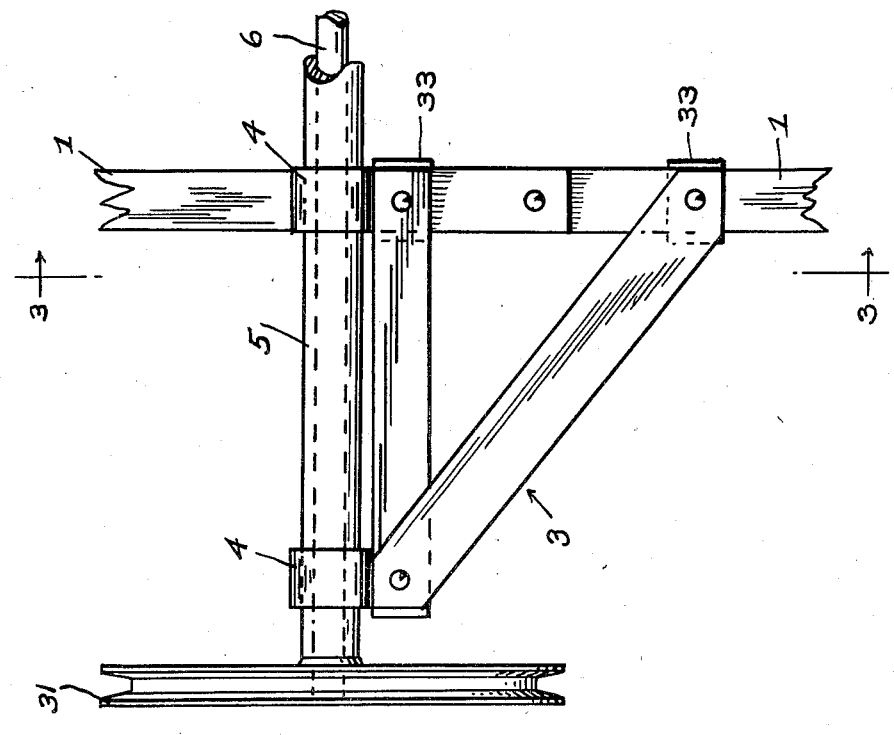
Figure 2 is a view in front elevation of the reel shaft bracket.

Referring now to the drawings in detail, it will be seen that the embodiment of the invention which has been illustrated comprises a reel post 1 of substantially square cross section which is provided with suitable means at its lower end, as at 2, for mounting said post on the reaper or other machine for swinging movement in a vertical plane. Mounted for vertical sliding adjustment on the post 1 is a bracket which is designated generally by the reference numeral 3, said bracket including transversely aligned clamps 4 which secure the tubular bearing 5 in position on the bracket 3. The shaft 6 of the reel is journaled in the bearing 5, said reel being designated generally by the reference numeral 7 and including the usual blades or paddles 8 mounted on the arms 9.

The reference numeral 10 designates an extensible shaft at one end rotatably supported on the post 1 below the bracket 3, as at 11. The other end portion of the shaft 10 is journaled in a suitable bearing 12 which is loosely mounted on a support 13, said support being secured in any suitable manner to the reaper, as by U-bolts or clamps 14. Fixed on the outer end of the shaft 10 is a bevelled gear 15. Fixed on the shaft 10 adjacent the post 1 is a sprocket 16. Interposed in the shaft 10 is a suitable universal joint 17. Between the universal joint 17 and the bearing 12, the shaft 10 is provided with a sliding connection 18. The connection 18 includes a polygonal socket slidably receiving a square portion of the shaft 10. Rotatably mounted on the upper portion of the post 1 is a sprocket 19. The reference numeral 20 designates an endless chain which is trained around the sprockets 16 and 19. Interposed in the chain 20 is a plate 21 to which the bearing 5 is secured by a U-bolt or clamp 22.

Mounted on the bearing 12 at right angles thereto is a bearing 23 in which a shaft 24 is journaled. On one end of the shaft 24 is fixed a beveled gear 25 which drives the gear 15. The other end of the shaft 24 is connected by a suitable universal joint 26 to a shaft 27. The shaft 27 may be of any suitable length and in any desired number of sections and the forward end portion of said shaft is journaled on a support 28 which is mounted, for example, on the draw bar 29 of the reaper. Fixed on the forward end portion of the shaft 27 is a crank 30 which is adapted to be operated from the seat of the tractor or other power unit.

Figure 3:
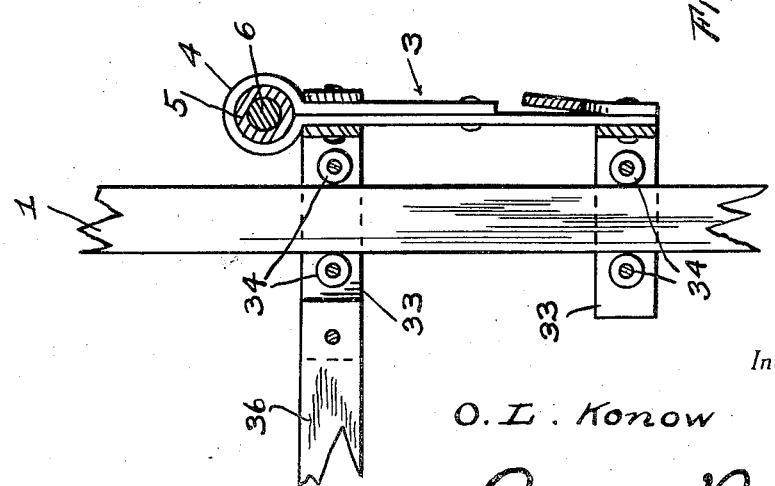
Figure 3 is a vertical sectional view, taken substantially on the line 3—3 of Fig. 2.

Fixed on the shaft 6 of the reel 7 is the usual pulley 31 over which a drive belt 32 is trained. The bracket 3 further includes a pair of substantially U-shaped members 33 which straddle the post 1. As illustrated to advantage in Fig. 3 of the drawings, rollers 34 are journaled in the members 33 and travel on opposite sides of the post 1.

The reference numeral 35 designates generally an automatic tightener for the belt 32. The belt tightener 35 includes a rod 36 of polygonal cross-section having its forward end pivotally connected to the uppermost member 33. The rear end portion of the rod 36 extends slidably through a substantially U-shaped guide 37 which is loosely mounted on the grain trough 38 of the reaper. A brace 39 extends from the outer portion of the bracket 3 to the rear end portion of the rod 36. Encircling the rod 36 and adapted to yieldingly urge same forwardly is a coil spring 40. The coil spring 40 is confined under tension between washers 41 and 42 which are slidably mounted on the rod 36. The washer 41 bears against a pin 43 in the rod 36 and the washer 42 bears against the guide 37.

It is thought that the operation of the invention will be readily apparent from a consideration of the foregoing. To elevate the reel 7 the crank 30 is turned in one direction for actuating the chain 20, thus raising said reel. Of course, to lower the reel 7 the crank 30 is turned in the opposite direction. The coil spring 40 of the tightener 35 yieldingly pushes forwardly on the swinging post 1 at all times for maintaining the proper tension on the reel drive belt 32.

It is believed that the many advantages of a harvester reel constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

In a harvesting machine including its frame and reel shaft, a post pivotally connected to a part of the frame at its lower end, a bracket, a tubular bearing carried by the bracket and through which the shaft passes, upper and lower roller carrying members attached to the bracket and through which the post passes with the rollers engaging the post, a movable member carried by the post and connected with the bracket for imparting vertical movement to the bracket, means including shafting, having universal joints and slip joints therein, and gearing for imparting movement to the movable member, means for supporting said shafting from the frame, a bar pivotally connected to one of the roller carrying members, means for slidably supporting the bar from the frame, spring means associated with the bar for forcing the frame in a certain direction and drive means for the shaft including a belt which is held taut by certain spring-pressed movement of the bar.

OTTO L. KONOW.